United States Patent
Wanjek et al.

(10) Patent No.: US 12,500,799 B2
(45) Date of Patent: Dec. 16, 2025

(54) DEVICE AND METHOD FOR TRANSMITTING DATA

(71) Applicant: SEW-EURODRIVE GMBH & CO. KG, Bruchsal (DE)

(72) Inventors: Andreas Wanjek, Waghäusel (DE); Mauricio Bucerius, Hambrücken (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 369 days.

(21) Appl. No.: 17/777,291

(22) PCT Filed: Nov. 3, 2020

(86) PCT No.: PCT/EP2020/025488
§ 371 (c)(1),
(2) Date: May 17, 2022

(87) PCT Pub. No.: WO2021/098981
PCT Pub. Date: May 27, 2021

(65) Prior Publication Data
US 2022/0400039 A1    Dec. 15, 2022

(30) Foreign Application Priority Data
Nov. 20, 2019 (DE) .......................... 102019008055.6

(51) Int. Cl.
*H04L 27/14* (2006.01)
*H04L 27/12* (2006.01)
*H04L 27/152* (2006.01)

(52) U.S. Cl.
CPC .......... *H04L 27/142* (2013.01); *H04L 27/122* (2013.01); *H04L 27/152* (2013.01)

(58) Field of Classification Search
CPC ... H04L 27/142; H04L 27/122; H04L 27/152; G01S 7/006; H03C 3/095
(Continued)

(56) References Cited

U.S. PATENT DOCUMENTS

| 5,920,556 | A | 7/1999 | Klaus | |
|---|---|---|---|---|
| 2011/0169578 | A1* | 7/2011 | Lucas | H03L 7/1976 331/25 |
| 2018/0031673 | A1* | 2/2018 | Kim | H04B 1/04 |

FOREIGN PATENT DOCUMENTS

| EP | 0961412 A1 | 12/1999 |
|---|---|---|
| EP | 1318598 A1 | 6/2003 |

(Continued)

OTHER PUBLICATIONS

International Search Report issued in corresponding International Application No. PCT/EP2020/025488 dated Feb. 8, 2021, pp. 1-2, English Translation.
(Continued)

*Primary Examiner* — Tanmay K Shah
(74) *Attorney, Agent, or Firm* — Carter, DeLuca & Farrell LLP (57) ABSTRACT

A device for transmitting data includes a transmitter for generating a frequency-modulated output signal. The transmitter includes a phase-locked loop for adjusting an output frequency of the output signal to a carrier frequency, and a coupling circuit for coupling a data stream into the phase-locked loop. The output signal modulated in frequency by the coupled-in data stream has an output frequency variable over time, and the coupling circuit includes a compensation unit, which couples a compensation signal into the phase-locked loop. The compensation signal compensates at least approximately for an adjustment of the output frequency to the carrier frequency carried out by the phase-locked loop.

11 Claims, 9 Drawing Sheets

(58) Field of Classification Search
USPC .......................................................... 375/334
See application file for complete search history.

(56) References Cited

FOREIGN PATENT DOCUMENTS

EP        3267578 A1    1/2018
EP        3511734 A1    7/2019

OTHER PUBLICATIONS

Marzin, G. et al., "A 20 Mb/s Phase Modulator Based on a 3.6 GHz Digital PLL With 36 dB EVM at 5 mW Power" IEEE Journal of Solid-State Circuits (Dec. 2012) pp. 2974-2988, vol. 47, No. 12.
International Report on Patentability issued in corresponding International Application No. PCT/EP2020/025488 dated May 17, 2022, pp. 1-6, English Translation.

* cited by examiner

DEVICE AND METHOD FOR TRANSMITTING DATA

FIELD OF THE INVENTION

The present invention relates to a device for transmitting data. The device includes, for example, a transmitter for generating a frequency-modulated output signal. The present invention also relates to a method for transmitting data with the aid of a device described herein.

BACKGROUND INFORMATION

In certain conventional systems, frequency modulation for transmitting data is provided. This is a modulation method, in which a carrier frequency is changed by a signal to be transmitted. In comparison with other modulation methods, such as amplitude modulation, frequency modulation allows a higher dynamic range of the information signal. In addition, frequency modulation is less susceptible to interference.

A modulator for generating an output signal is described in "A 10 Mb/s Hybrid Two-Point Modulator with Front-End Phase Selection and Dual-Path DCO Modulation." The modulator includes a phase-locked loop (PLL), which has a voltage-controlled oscillator (VCO).

The document "A Low Power Transmitter for Phase-Shift Keying Modulation Schemes," 2006 IEEE, describes a modulation system for generating an output signal. The modulation system also includes a phase-locked loop having a voltage-controlled oscillator.

A phase-locked loop having a follow-up oscillator is described in European Patent Document No. 1 318 598. In this context, an output signal of the oscillator is compared to a reference signal. A compensation signal, through which signal shifts may be compensated for, is supplied to a loop filter by a compensation unit.

A frequency generator, which includes a voltage-controlled oscillator and a phase-locked loop, is described in European Patent Document No. 0 961 412.

A method of synthesizing frequencies is described in U.S. Pat. No. 5,920,556. In this context, an error signal compensated for is generated and supplied to a voltage-controlled oscillator.

In order to obtain a modulated signal, which may be used for data transmission, at the output of a voltage-controlled oscillator in a phase-locked loop, a control signal is applied to the input of the voltage-controlled oscillator. The control signal includes a steady component, which is superimposed by an offset. The offset is a function of the bit pattern of a data stream to be transmitted. If the offset due to the bit pattern continues, so that the output signal has a changed, in particular, increased, output frequency in comparison with the carrier frequency, the phase-locked loop adjusts back to the original carrier frequency with time. In this case, correct demodulation of the output signal is not possible for a receiver of the output signal, which is in the form of a remote station of the communication.

SUMMARY

Example embodiments of the present invention provide a device and a method for transmitting data with the aid of frequency modulation. In this context, for example, data transmission at a comparatively high bandwidth should be provided, and a necessary difference in the output frequency of the output signal from the carrier frequency is maintained during the data transmission.

A device for transmitting data includes a transmitter for generating a frequency-modulated output signal. The frequency-modulated output signal includes, for example, a chronological sequence of signal portions, which each have an at least approximately constant signal frequency. In this context, at least one signal frequency is different from a carrier frequency.

According to example embodiments of the present invention, the transmitter includes a phase-locked loop for adjusting an output frequency of the output signal to a carrier frequency. The transmitter also includes a coupling circuit for coupling a data stream into the phase-locked loop. In this context, the output signal modulated in frequency by the coupled-in data stream has an output frequency variable over time. In this case, the coupling circuit includes a compensation unit, which couples a compensation signal into the phase-locked loop. In this context, the compensation signal compensates at least roughly for an adjustment of the output frequency to the carrier frequency by the phase-locked loop.

In this context, the output frequency of the output signal generated by the transmitter may be set to a plurality of signal frequencies as a function of the coupled-in data stream, and at least one signal frequency is different from the carrier frequency. Such a modulation method including exactly two signal frequencies is also referred to as frequency-shift keying (FSK). Such a modulation method including more than two signal frequencies is also referred to as multi-frequency shift keying (MFSK). By coupling in the compensation signal, the output signal set to a signal frequency is prevented from drifting towards the carrier frequency. Therefore, the necessary difference of the output frequency from the carrier frequency is maintained during the data transmission.

According to example embodiments of the present invention, the coupling circuit of the transmitter includes a summing point for adding the data stream to be coupled in, and the compensation signal, to form a correction signal. In this context, the coupling circuit couples the correction signal into the phase-locked loop. Consequently, it is only necessary to couple one signal, namely, the correction signal, into the phase-locked loop. In this context, such a summing point is relatively simple to produce from the standpoint of circuit engineering.

According to example embodiments of the present invention, the phase-locked loop includes a voltage-controlled oscillator for generating the output signal, a controller for generating a setting signal, and a summing point for summing the setting signal and a correction signal to form a control signal. In this instance, the control signal is applied to the oscillator. The output frequency of the output signal is at least approximately proportional to a voltage of the control signal. In this context, the correction signal is coupled into the phase-locked loop by, for example, the coupling circuit.

The phase-locked loop of the transmitter takes, for example, the form of a radar transmitter for carrying out a radar measurement. Thus, an available radar transmitter may be used for transmitting data with the aid of frequency modulation. Consequently, an additional, separate circuit for generating the frequency-modulated output signal is not necessary. Comparatively rapid changes of the output frequency from one signal frequency to another signal frequency are possible. The adjustment of the output frequency to the carrier frequency carried out in the phase-locked loop is relatively slow, for example, if the controller of the phase-locked loop exhibits PT1 behavior or PT2 behavior. This comparatively slow adjustment in the phase-locked loop is compensated for, at least approximately, by the compensation signal generated by the compensation unit.

According to example embodiments of the present invention, the compensation unit includes a compensation input, to which a setting signal is applied. In this context, the setting signal is generated, for example, by the controller of the phase-locked loop. It is additionally considered advantageous that the compensation unit includes a compensation output for generating the compensation signal.

According to example embodiments of the present invention, the coupling circuit includes a switch element, with the aid of which the coupling circuit may be switched into a data transmission mode and into a radar mode. In the data transmission mode, the data stream and the compensation signal are coupled into the phase-locked loop. In the radar mode, the data stream and the compensation signal are not coupled into the phase-locked loop. If the phase-locked loop of the transmitter is a radar transmitter, for example, the transmitter may be used alternately for transmitting data and for carrying out a radar measurement.

According to a method of an example embodiment of the present invention for transmitting data with the aid of a device as described herein for transmitting data, a frequency-modulated output signal is generated by the transmitter. A data stream is coupled into the phase-locked loop by the coupling circuit, so that the output signal modulated in frequency by the coupled-in data stream has an output frequency variable over time. A compensation signal, by which an adjustment of the output frequency to the carrier frequency carried out by the phase-locked loop is compensated for at least approximately, is coupled into the phase-locked loop by the compensation unit.

In this context, the output frequency of the output signal generated by the transmitter is set to a plurality of signal frequencies as a function of the coupled-in data stream, at least one signal frequency being different from the carrier frequency. By coupling in the compensation signal, the output signal set to a signal frequency is, for example, prevented from drifting towards the carrier frequency. Therefore, the necessary difference of the output frequency from the carrier frequency is maintained during the data transmission.

According to example embodiments of the present invention, the data stream and the compensation signal are added at a summing point of the coupling circuit to form a correction signal. In this context, the correction signal is coupled into the phase-locked loop by the coupling circuit. Thus, only one signal, namely, the correction signal, is coupled into the phase-locked loop. Such addition of signals at a summing point is relatively simple to implement from the standpoint of circuit engineering.

According to example embodiments of the present invention, the output signal is generated by a voltage-controlled oscillator of the phase-locked loop. In addition, a setting signal is generated by a controller of the phase-locked loop. The setting signal and a correction signal are summed at a summing point of the phase-locked loop to form a control signal. The control signal is applied to the oscillator. In this context, the output frequency of the output signal is at least approximately proportional to a voltage of the control signal. In this context, the correction signal is coupled into the phase-locked loop by, for example, the coupling circuit.

The phase-locked loop of the transmitter takes, for example, the form of a radar transmitter for carrying out a radar measurement. Thus, an available radar transmitter is used for transmitting data with the aid of frequency modulation. Consequently, an additional, separate circuit for generating the frequency-modulated output signal is not necessary. Comparatively rapid changes of the output frequency from one signal frequency to another signal frequency are possible. The adjustment of the output frequency to the carrier frequency carried out in the phase-locked loop is relatively slow, for example, if the controller of the phase-locked loop exhibits PT1 behavior or PT2 behavior. This comparatively slow adjustment in the phase-locked loop is compensated for, at least approximately, by the compensation signal generated by the compensation unit.

According to example embodiments of the present invention, a setting signal is applied to a compensation input of the compensation unit. In this context, the setting signal is generated, for example, by the controller of the phase-locked loop. In addition, the compensation signal is generated by a compensation output of the compensation unit.

According to example embodiments of the present invention, with the aid of a switch element, the coupling circuit is switched in a data transmission mode and in a radar mode in a chronological sequence. In the data transmission mode, the data stream and the compensation signal are coupled into the phase-locked loop. In the radar mode, the data stream and the compensation signal are not coupled into the phase-locked loop. If the phase-locked loop of the transmitter is a radar transmitter, for example, the transmitter is used alternately for transmitting data and for carrying out a radar measurement.

Further features and aspects of example embodiments of the present invention are explained in greater detail with reference to the appended schematic Figures.

DETAILED DESCRIPTION

Figure 1:
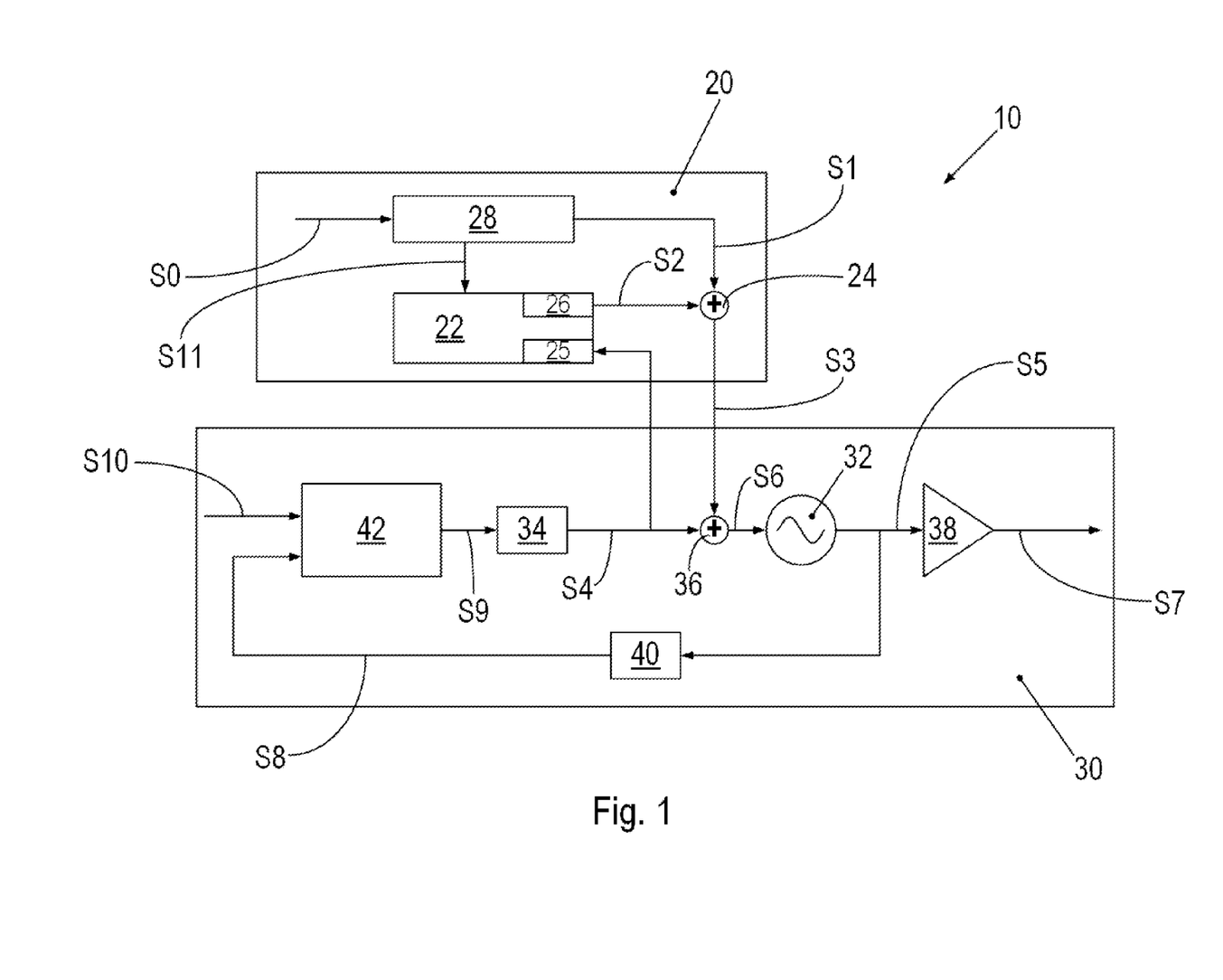
FIG. 1 is a schematic view of a transmitter.

FIG. 1 schematically illustrates a transmitter 10 of a device for transmitting data. Transmitter 10 is used for generating a frequency-modulated output signal S5. Transmitter 10 includes a phase-locked loop 30 and a coupling circuit 20. Phase-locked loop 30, for example, is a radar transmitter and is used for carrying out a radar measurement.

Phase-locked loop 30 includes a voltage-controlled oscillator 32, by which the output signal S5 having a variable output frequency is generated. Phase-locked loop 30 further includes an amplifier 38, by which aforementioned output signal S5 is amplified to form an amplified output signal S7 having the same variable output frequency.

Phase-locked loop 30 includes a frequency divider 40, which is supplied the output signal S5 generated by voltage-controlled oscillator 32. Frequency divider 40 has a division ratio, which is, for example, integral. Frequency divider 40 generates an input signal S8, whose input frequency corresponds to the output frequency of output signal S5 divided by the division ratio.

Phase-locked loop 30 includes a detector 42, which is supplied a reference signal S10 having a reference frequency. Detector 42 is also supplied the input signal S8, which is generated by frequency divider 40 and has the input frequency. Detector 42 compares the reference frequency of reference signal S10 to the input frequency of input signal S8. Detector 42 outputs an error signal S9. Detector 42 includes, for example, a charge pump for outputting error signal S9. Error signal S9 is a function of the reference frequency of reference signal S10, as well as of a difference between reference signal S10 and input signal S8.

Phase-locked loop 30 includes a controller 34, which is supplied error signal S9. A setting signal S4 is generated by controller 34. Controller 34 exhibits PT1 behavior or PT2 behavior. Setting signal S4 is an analog signal, whose voltage is a measure of the output frequency of the output signal S5 generated by oscillator 32; the output frequency having to be adjusted.

Phase-locked loop 30 includes a summing point 36. Setting signal S4 and a correction signal S3 are summed at summing point 36 to form a control signal S6. Control signal S6 is applied to oscillator 32. In this context, the output frequency of the output signal S5 generated by oscillator 32 is proportional to a voltage of control signal S6.

Coupling circuit 20 includes a switch element 28. With the aid of switch element 28, coupling circuit 20 may be switched into a data transmission mode and into a radar mode. Switch element 28 generates, for example, a binary switching signal S11. The mode, into which coupling circuit 20 is switched, is encoded in switching signal S11.

Coupling circuit 20 includes a compensation unit 22, to which switching signal S11 is supplied. Compensation unit 22 includes a compensation input 25, which, for example, has an analog-to-digital converter. Compensation input 25 is supplied setting signal S4. Compensation unit 22 also includes a compensation output 26, which, for example, has a digital-to-analog converter. When coupling circuit 20 is switched to the data transmission mode, a compensation signal S2 is generated by compensation output 26.

Switch element 28 is supplied an input data stream S0. When coupling circuit 20 is switched to the data transmission mode, switch element 28 generates a data stream S1, which corresponds to input data stream S0. An adjustment of a voltage level or a modulation of input data stream S0 is optionally carried out by switch element 28. Data stream S1, for example, is a binary signal and has either the state "0" or the state "1."

Coupling circuit 20 includes a summing point 24. At summing point 24, data stream S1 and compensation signal S2 are added to form correction signal S3. Correction signal S3 is coupled into phase-locked loop 30. For example, correction signal S3 is supplied to summing point 36.

Figure 2:
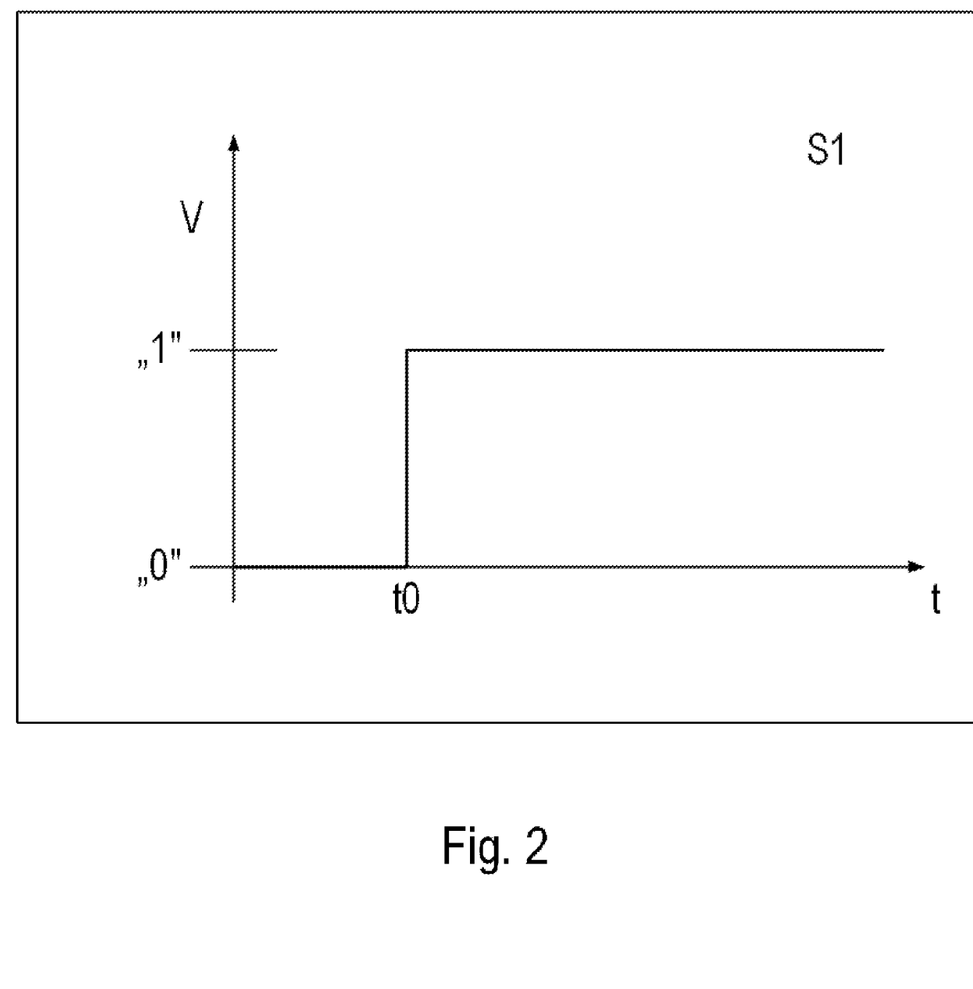
FIG. 2 illustrates a time characteristic of a data stream.

FIG. 2 shows, for example, a time characteristic of a data stream S1, which is, for example, a binary signal. Time t is plotted on the abscissa, and voltage V of data stream S1 is plotted on the ordinate. Voltage V of data stream S1 initially has a voltage value, which corresponds to the state "0." At a time t0, data stream S1 changes its state, and its voltage V now jumps to a voltage value, which corresponds to the state "1." The voltage value assigned to the state "0" is, for example, greater than the voltage value assigned to the state "1."

Figure 3:
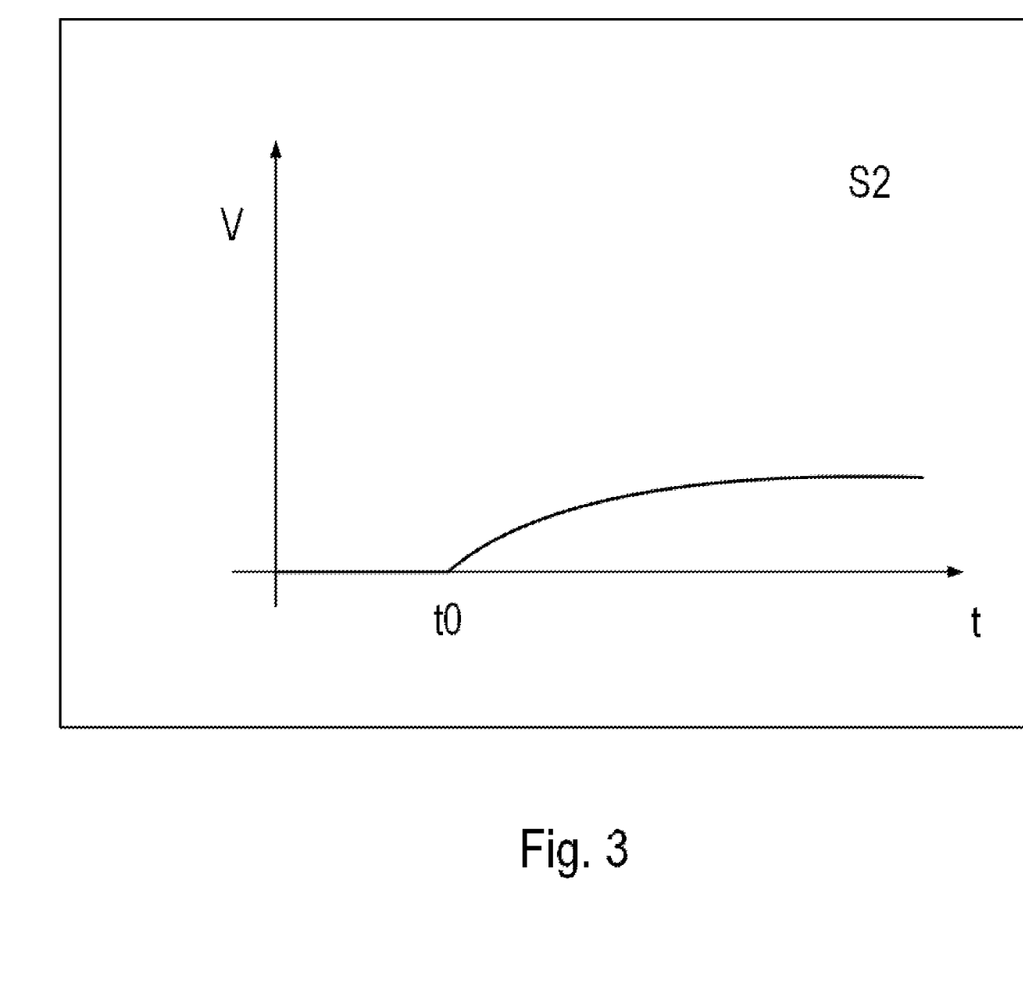
FIG. 3 illustrates a time characteristic of a compensation signal.

FIG. 3 illustrates an example of a time characteristic of a compensation signal S2. Time t is plotted on the abscissa, and voltage V of compensation signal S2 is plotted on the ordinate. The voltage value of compensation signal S2 is initially constant. As of time t0, the voltage value of compensation signal S2 increases continuously.

Figure 4:
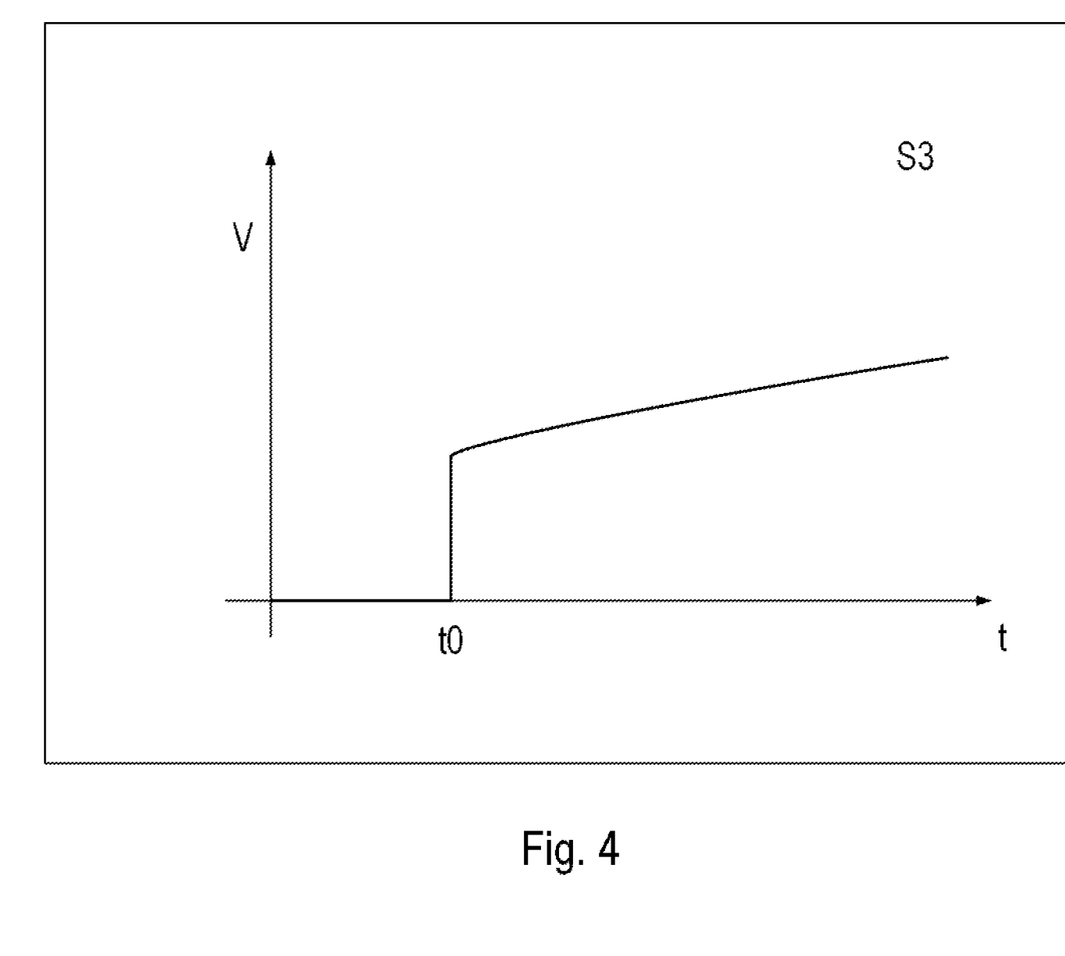
FIG. 4 illustrates a time characteristic of a correction signal.

FIG. 4 illustrates an example of a time characteristic of a correction signal S3. Time t is plotted on the abscissa, and voltage V of correction signal S3 is plotted on the ordinate. The voltage value of correction signal S3 is initially constant. At time t0, voltage V of correction signal S3 jumps to a higher voltage value. As of time t0, the voltage value of correction signal S3 increases continuously. The voltage value of correction signal S3 corresponds to the sum of the voltage values of data stream S1 and of compensation signal S2.

Figure 5:
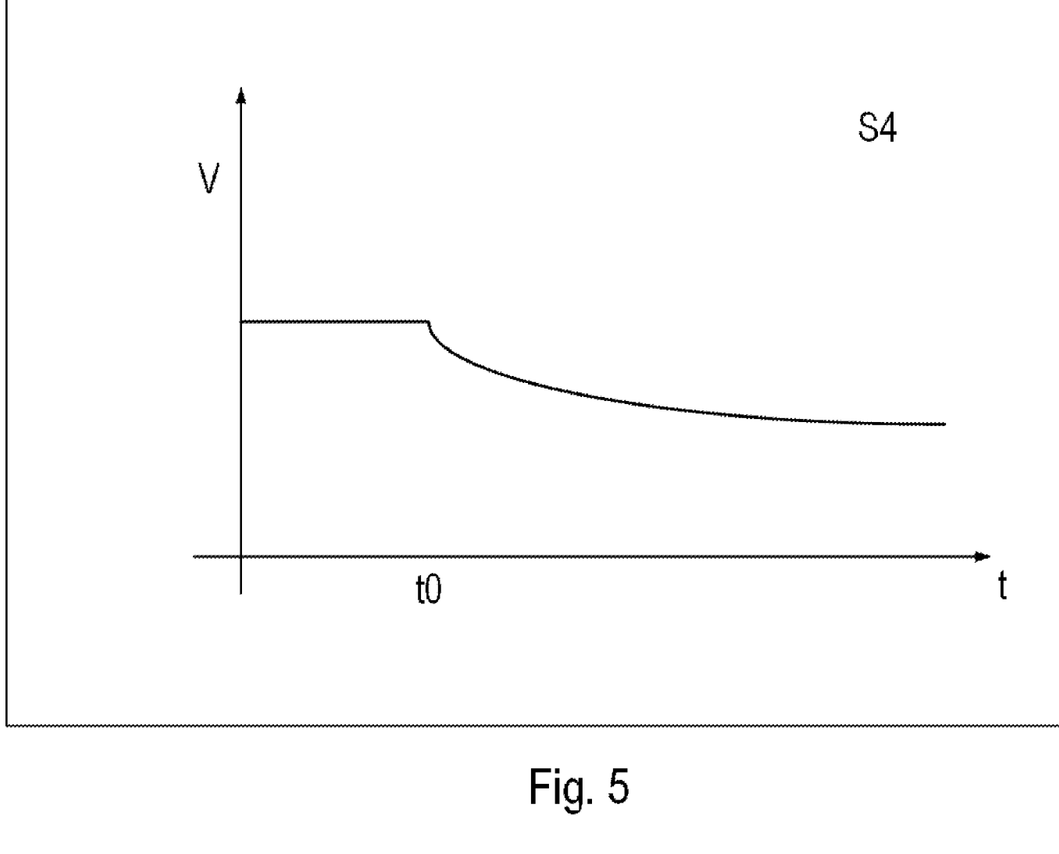
FIG. 5 illustrates a time characteristic of a setting signal.

FIG. 5 illustrates an example of a time characteristic of a setting signal S4. Time t is plotted on the abscissa, and voltage V of setting signal S4 is plotted on the ordinate. The voltage value of setting signal S4 is initially constant. From time t0 on, the voltage value of setting signal S4 decreases continuously. For example, as of time t0, compensation signal S2 is complementary to setting signal S4. Consequently, the fall of setting signal S4 is compensated for by the ascent of compensation signal S2.

Figure 6:
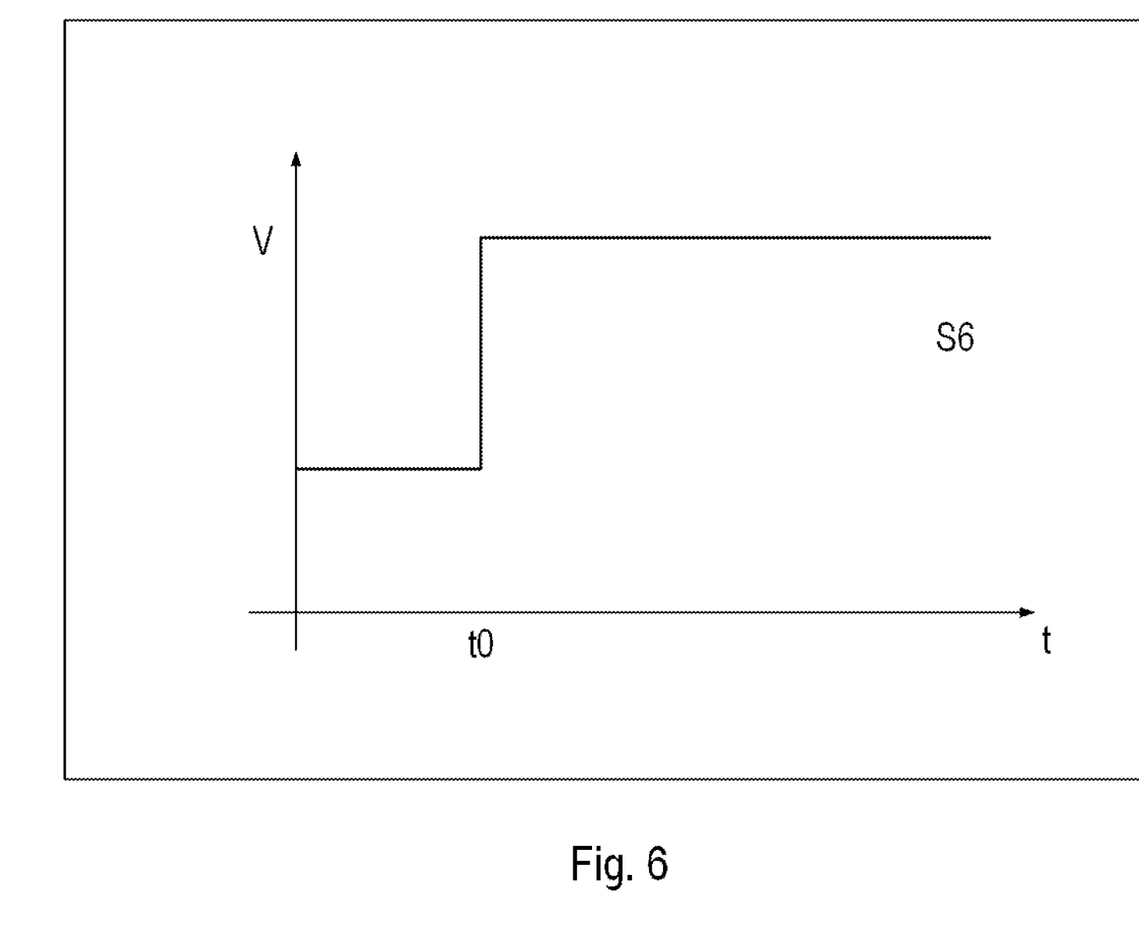
FIG. 6 illustrates a time characteristic of a control signal.

FIG. 6 illustrates an example of a time characteristic of a control signal S6. Time t is plotted on the abscissa, and voltage V of control signal S6 is plotted on the ordinate. The voltage value of control signal S6 is initially constant. At time t0, voltage V of control signal S6 jumps to a higher voltage value. The voltage value of control signal S6 corresponds to the sum of the voltage values of correction signal S3 and setting signal S4.

Figure 7:
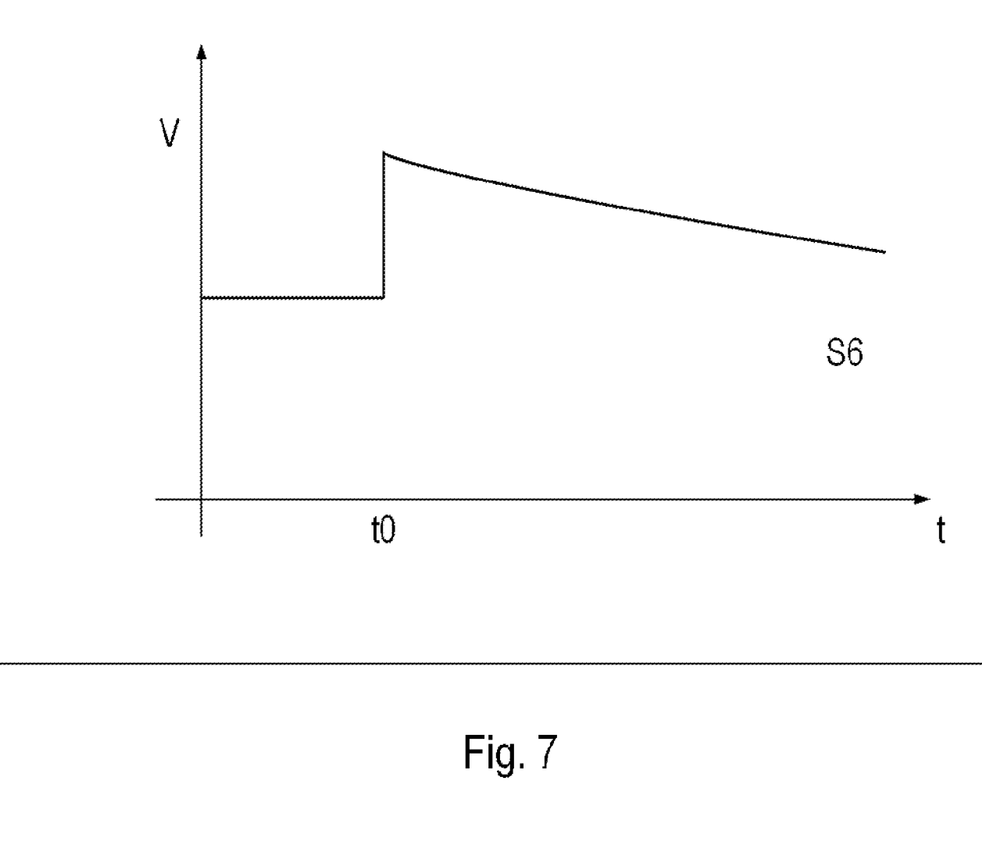
FIG. 7 illustrates a time characteristic of a control signal without compensation.

For the sake of comparison, FIG. 7 illustrates a time characteristic of a control signal S6 without compensation, that is, without the generation of compensation signal S2. Time t is plotted on the abscissa, and voltage V of control signal S6 is plotted on the ordinate. The voltage value of control signal S6 is initially constant. At time t0, voltage V of control signal S6 jumps to a higher voltage value. From time t0 on, the voltage value of control signal S6 decreases continuously. In this case, the voltage value of control signal S6 corresponds to the sum of the voltage values of data stream S1 and setting signal S4.

Figure 8:
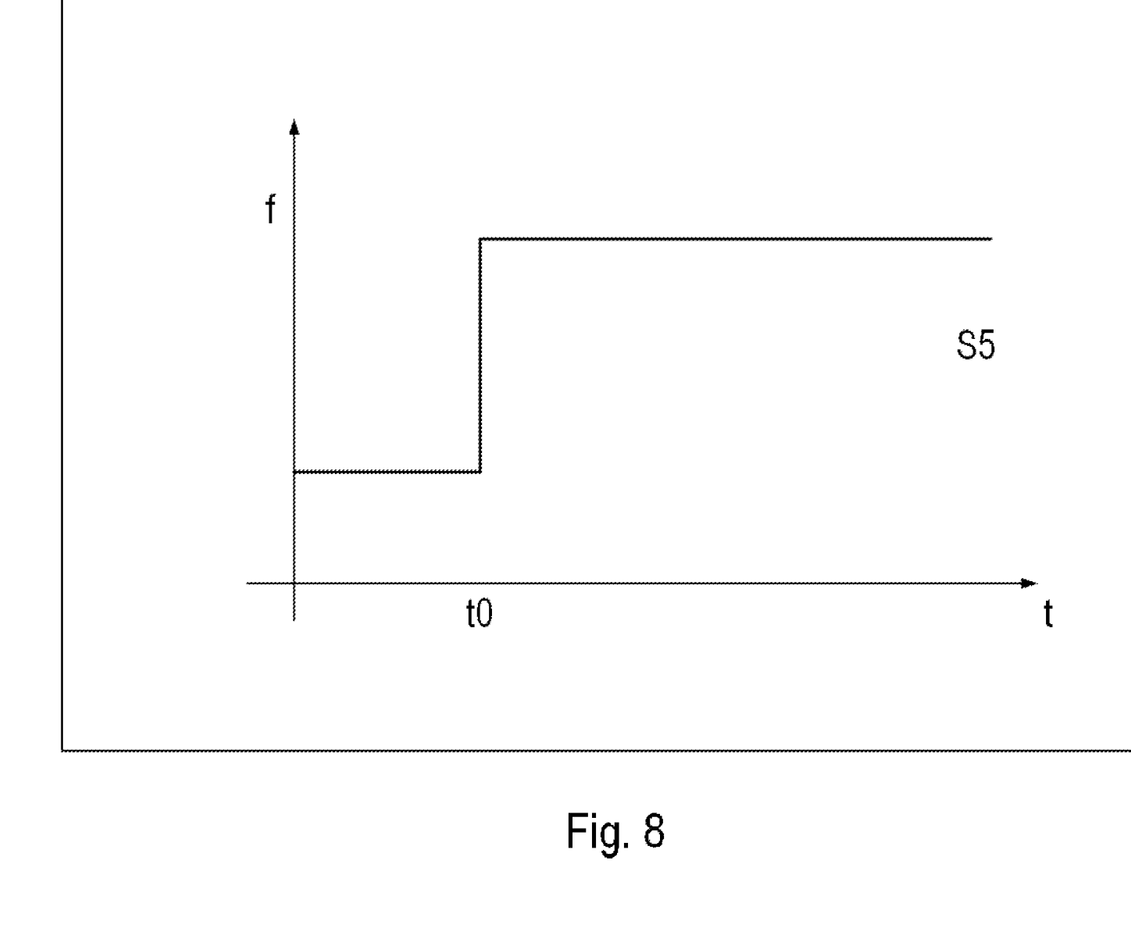
FIG. 8 illustrates a time characteristic of an output frequency of an output signal.

FIG. 8 illustrates an example of a time characteristic of an output frequency of an output signal S5. Time t is plotted on the abscissa, and frequency f is plotted on the ordinate. The output frequency of output signal S5 initially has a first signal frequency. At time t0, the output frequency of output signal S5 jumps to a second signal frequency. For example, the second signal frequency is higher than the first signal frequency.

In this context, the output frequency of output signal S5 correlates with the voltage value of data stream S1. The output frequency of output signal S5 has the first signal frequency, when the voltage value of data stream S1 corresponds to the state "0." The output frequency of output signal S5 has the second signal frequency, when the voltage value of data stream S1 corresponds to the state "1."

Figure 9:
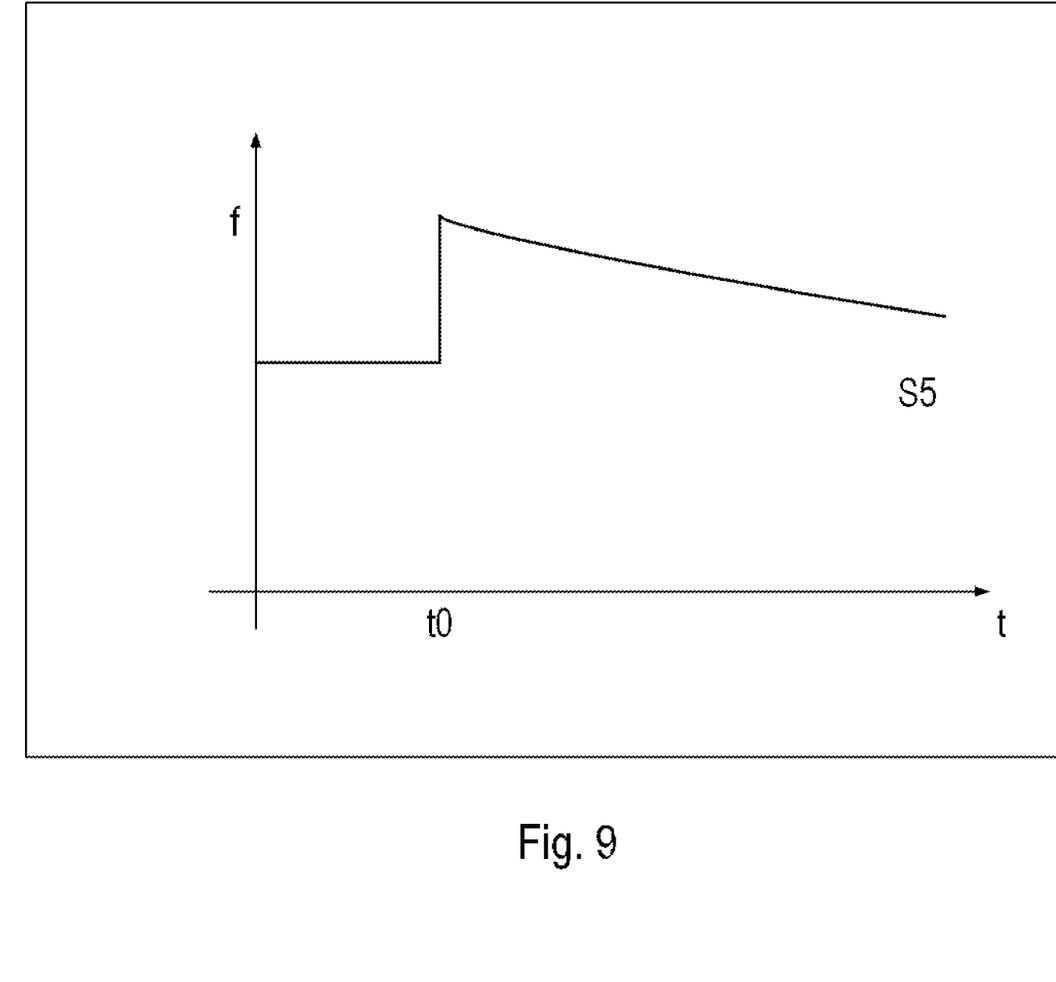
FIG. 9 illustrates a time characteristic of an output frequency of an output signal without compensation.

For the sake of comparison, FIG. 9 illustrates a time characteristic of an output frequency of an output signal S5 without compensation, that is, without the generation of compensation signal S2. Time t is plotted on the abscissa, and frequency f is plotted on the ordinate. The output frequency of output signal S5 initially has the first signal frequency. At time t0, the output frequency of output signal S5 jumps to the second signal frequency. As of time t0, the output frequency of output signal S5 decreases continuously.

For example, the first signal frequency corresponds to a carrier frequency, and the second signal frequency is different from the carrier frequency. From time t0 on, phase-locked loop 30 adjusts the output frequency of output signal S5 to the carrier frequency. As of time t0, the characteristic of the output frequency of output signal S5 is subject to, for example, the action of controller 34. Controller 34, for example, exhibits PT1 behavior or PT2 behavior. Therefore, the output frequency of output signal S5 approaches the carrier frequency asymptotically.

LIST OF REFERENCE CHARACTERS 10 transmitter
20 coupling circuit
22 compensation unit
24 summing point
25 compensation input
26 compensation output
28 switch element
30 phase-locked loop
32 oscillator
34 controller
36 summing point
38 amplifier
40 frequency divider
42 detector
S0 input data stream
S1 data stream
S2 compensation signal
S3 correction signal
S4 setting signal
S5 output signal
S6 control signal
S7 amplified output signal
S8 input signal
S9 error signal
S10 reference signal
S11 switching signal
V voltage
t time
t0 time
f frequency

What is claimed is:

1. A device for transmitting data, comprising:
a transmitter adapted to generate a frequency-modulated output signal, the transmitter including a phase-locked loop adapted to adjust an output frequency of the output signal to a carrier frequency, and a coupling circuit adapted to couple a data stream into the phase-locked loop;
wherein the output signal has an output frequency that is variable over time; and
wherein the coupling circuit includes a compensation unit adapted to couple a compensation signal into the phase-locked loop to compensate at least approximately for an adjustment of the output frequency to the carrier frequency.

2. The device according to claim 1, wherein the coupling circuit includes a summing point adapted to add the data stream and the compensation signal to form a correction signal, and the coupling circuit is adapted to couple the correction signal into the phase-locked loop.

3. The device according to claim 1, wherein the phase-locked loop includes a voltage-controlled oscillator adapted to generate the output signal, a controller adapted to generate a setting signal, and a summing point adapted to sum the setting signal and a correction signal to form a control signal applied to an oscillator, the output frequency of the output signal being at least approximately proportional to a voltage of the control signal.

4. The device according to claim 1, wherein the phase-locked loop includes a radar transmitter adapted to perform a radar measurement.

5. The device according to claim 1, wherein the compensation unit includes a compensation input adapted to receive a setting signal and a compensation output adapted to generate the compensation signal.

6. The device according to claim 1, wherein the coupling circuit includes a switch adapted to switch the coupling circuit into a data transmission mode, in which the data stream and the compensation signal are coupled into the phase-locked loop, and into a radar mode, in which the data stream and the compensation signal are not coupled into the phase-locked loop.

7. A method for transmitting data using the device recited in claim 1, comprising:
generating a frequency-modulated output signal by the transmitter;
coupling the data stream into the phase-locked loop by the coupling circuit to modulate the output signal in frequency by the coupled-in data stream that has an output frequency variable over time; and
coupling into the phase-locked loop, by the compensation unit, a compensation signal, by which an adjustment of the output frequency to the carrier frequency performed by the phase-locked loop is compensated for at least approximately.

8. The method according to claim 7, wherein the data stream and the compensation signal are added at a summing point of the coupling circuit to form a correction signal, and the correction signal is coupled into the phase-locked loop by the coupling circuit.

9. The method according to claim 7, wherein the output signal is generated by a voltage-controlled oscillator of the phase-locked loop, a setting signal is generated by a controller of the phase-locked loop, the setting signal and a correction signal are summed at a summing point of the phase-locked loop to form a control signal, the control signal is applied to the oscillator, and the output frequency of the output signal is at least approximately proportional to a voltage of the control signal.

10. The method according to claim 7, wherein the phase-locked loop includes a radar transmitter adapted to perform a radar measurement.

11. The method according to claim 7, wherein a setting signal is applied to a compensation input of the compensation unit, and the compensation signal is generated by a compensation output of the compensation unit.

* * * * *